United States Patent [19]

Aulson

[11] Patent Number: 5,457,271
[45] Date of Patent: Oct. 10, 1995

[54] ENVIRONMENTALLY CONTAINED MOBILE CHIPPER ASSEMBLY

[76] Inventor: Alan P. Aulson, 203 Pond St., Georgetown, Mass. 01833

[21] Appl. No.: 150,971

[22] Filed: Nov. 12, 1993

Related U.S. Application Data

[63] Continuation-in-part of Ser. No. 757,960, Sep. 12, 1991, abandoned.

[51] Int. Cl.$^6$ ........................................................ B65F 3/00
[52] U.S. Cl. .................................... 588/249; 241/DIG. 38
[58] Field of Search ............................... 241/79.1, 101.7, 241/DIG. 38; 588/249

[56] References Cited

U.S. PATENT DOCUMENTS 3,496,977  2/1970  Gifford ............................. 241/101.7 X
4,338,985  7/1982  Smith et al. ...................... 241/101.7 X
4,703,614  11/1987 Cooper et al. .................... 241/101.7 X
4,961,539  10/1990 Deem ................................ 241/101.7 X
5,137,219  8/1992  Morey ............................... 241/101.7 X
5,233,796  8/1993  Mazalewski ............................ 51/426
5,240,188  8/1993  Whitmire .......................... 241/101.7 X
5,328,104  7/1994  Lima et al. ....................... 241/101.7 X

FOREIGN PATENT DOCUMENTS 8909090  10/1989  WIPO ................................. 241/101.7

Primary Examiner—John A. Ricci
Attorney, Agent, or Firm—Don Halgren

[57] ABSTRACT

A treatment system for the safe disposal and containment of lead base painted wood comprising a mobile chipper arranged in a housing with an articulable conduit arranged to direct the chips to a container and further to a filtration unit. The chipper unit generates its own vacuum to pressurize the chips down the conduit and keep hazardous debris from escaping into the envirinment.

20 Claims, 3 Drawing Sheets

ENVIRONMENTALLY CONTAINED MOBILE CHIPPER ASSEMBLY

This is a Continuation-In-Part Application of my copending U.S. patent application Ser. No. 07/757,960, filed Sep. 12, 1991, now abandoned all of which is also incorporated herein by reference.

BACKGROUND OF THE INVENTION (1) Field of the Invention

This invention relates to toxic waste containment systems, and more particularly to a mobile arrangement for treatment of articles that have been contaminated with lead paint.

(2) Prior Art

Lead poisoning poses a terrible environmental threat, particularly for young people. Levels of 10 micrograms of lead per deciliter of blood, if maintained in young children, can affect mental capacities and result in grave behavioral and physical problems.

About 3 million to 4 million American children, or about out of every 6 under six years old, have lead poisoning. While only 7% of young children from medium income families are afflicted, about 25% of poor white children and an incredible 55% of those from low income minority families.

The US Department of Health and Human Services warns that even moderate exposure to lead can be more pervasive and long lasting than previously thought. Government regulations have already phased out most leaded gasolines. Lead-based paints have been banned from most uses since 1977. However, a 1988 Public Health Service report revealed that 52%, or 42 million of the nation's housholds have layers of lead-based point on their woodwork.

Lead is highly toxic even in minute quantities. Once it is ingested, lead enters the bloodstream, where it inhibits the production of hemoglobin which red blood cells need to carry oxygen. It also locks onto essential enzymes in the brain and central nervous system to inactivate them. Symptoms of lead poinsoning include abdominal pains, muscular weakness and fatigue; severe exposure can cause nervous system disorders, high blood pressure and even death.

Small children have the greatest risk because their nervous systems and brains are still developing. Lead can be removed from humans by a process doctors call chelation, using drugs that bind to the metal in the bloodstream, and flush it out in the urine, if treatment is begun before too much damage is done.

However, medical treatment is no substitute for a safe environment. The Health and Human Services plan calls for (1) surveillance of children with elevated levels of lead in their blood; (2) elimination of leaded paint and contaminated dust in housing; (3) reduction of children's exposure to lead in food, air, soil and water; and (4) an increase in community programs for the prevention of childhood lead poisoning. Eliminating lead from all pre-1950 housing would save as much as $28 billion in medical expenses and other costs, but at an expense of about $10 billion to put this plan into effect over the next 10 years.

Eliminating the lead problem by painted encapsulants is a current hope of researchers at the University of Lowell in Lowell, Mass. Acrylic, polyester and epoxy are the planned materials which might be painted upon the lead paint surface where they will hopefully dissolve the paint and cross link with it onto the wood or plaster below. The goal appears to be to interlock the materials. Some of the tests done on the treated surfaces will include impact resistance. When you hit it, does it chip and produce lead dust? Abrasion and adhesion tests are also important, as will be aging tests to see how long the coating will last and what effect heat, light and household cleaners might have on it. The encapsulants will have to be developed, and of course, pass these aforementioned tests.

BRIEF SUMMARY OF THE INVENTION

The present invention relates to a novel arrangement for removal and disposal of hazardous lead painted wood waste and construction debris from a building site, done in conformance with United States Environmental Protection Agency (EPA) requirements for the disposition of such waste.

The present invention therefore comprises a novel arrangement for the treatment of wood construction material which has been painted with a lead based paint. The novel arrangement comprises an environmentally controlled unit which receives construction material such as timbers, doors, door frames, windows, window frames, sills, floors and the like at a building site being treated or refurbished.

The environmentally controlled unit comprises a mobile trailer which has its critical treatment facilities thereon arranged in a contained environment, to minimize the spreading of environmental contamination, preventing accidental passage of leaded waste from escaping the control of the unit. The mobile unit includes a boxtrailer housing having a floor, a ceiling, front, side and back walls and doors, mounted on a wheel frame structure so as to permit its movement from construction site to construction site.

The housing includes a wood chipper machine disposed within the mobile housing to create its own negative pressure environment, wherein a machine operator may run the chipper. The wood chipper machine has a power source which empowers the machine. The chipper machine system includes a contained environment to prevent contaminated or hazardous waste from entering the environment. The chipper machine receives hazardous debris through a feed channel through the housing. This feed channel helps effect a suction of air therealong, to prevent hazardous waste air from escaping out of the system.

A discharge conduit is arranged from the chipper machine through a wall of the housing. The discharge conduit has a further discharge conduit directed from the housing into a primary containment unit. A universal joint is arranged in the wall of the housing to permit directionality to be changed in the further discharge unit.

The primary containment unit is a mobile free standing receiver to hold the majority of waste products discharged from the chipper machine. The containment unit has a central distributor to facilitate even dispersal of the hazardous waste of the chipper machine.

A fines filtration system is arranged through a discharge conduit in the primary containment unit. The fines filtration system receives pressurized air and hazardous dust in a pressurized manner, from the positive pressure created within the discharge conduit and the further discharge conduit.

The fines filtration system may be comprised of filtration bags to fully capture the hazardous waste dust, and permit the pressurized air to be released, uncontaminated, into the environment. The filtration bags are woven nylon of high denier, which entrap the hazardous dust, and permit the pressurized air to pass through, in a known manner.

This contained system, with the suction or negative pressure within the housing, effected by the chipping machine itself within that housing, the enclosed discharge, and the containment and filtration capturing of the debris and dust provides a unique arrangement of decontaminating sites of hazardous waste at geographically disparate locations because of the mobility of the trailer housing and the mobility of the separate attendent containment and filtration components of the system. The articulability of the discharge conduit from the housing further facilitates locating and setup of such a system at a variety of possibly difficult terrain at a building site being decontaminated of hazardous waste materials such as lead painted surfaces (wood, etc.)

The invention thus comprises a mobile hazardous waste treatment system for the removal and recycling of lead base paint treated woodwork, without exposure of that hazardous waste to the atmosphere outside of the system comprising: a housing arranged on a mobile truck frame, the housing having an arrangement of front and side walls on a floor, and a roof member all enclosing a rotatively empowered waste chipping device, the mobile truck frame permitting the housing to be moved from one site to another; a movable waste product container unit arranged to receive waste lead material from the trailer unit, the waste product container unit being in fluid communication with the trailer unit through an articulable conduit arranged therebetween; a filteration unit being in fluid communication with the waste product container unit through a conduit arranged therebetween; a side port arranged to direct hazardous waste into the waste chipping device; a feed conduit for supplying hazardous lead base painted wood articles into the side port and into the waste chipping device; a discharge conduit arranged from the chipping device through the housing to an articulable discharge conduit for transmitting small chips of wood with lead thereon into proper containment for subsequent safe utilization thereof. The system includes a containment unit having a receiving port for receiving chips from the discharge conduit. The articulable discharge conduit comprises a duct with a swivel joint arranged within a wall portion of the housing unit, to permit the discharge conduit to be readily directed towards the location of the waste containment unit. The means for treating the hazardous material comprises an empowered chipping machine which breaks up large pieces of lead covered timber products into small flowable pieces for conduction to the containment unit. The containment unit has a waste products dispersal distributor therein to spread the chips throughout said containment unit. The distributor comprises an inverted U-shaped channel with a lowermost slit extending along the length of the containment unit for the spreading of the chips therethrough. The chips in the containment unit may be shipped to a Treatement Storage or Dispersal Facility for proper disposal, or to a smelter for recycling therein, to retreive any lead therefrom. The means for treating the hazardous material generates a negative pressure through the input conduit to prevent escape of stray scraps of hazardous material from the trailer unit.

The invention includes a method of treating wooden building components which have been painted with lead-based paint, to safely remove them from endangering people and harming the environment, comprising the steps of: feeding lead-base painted wood components into a hazardous waste treatment chipper in an environmentally safe containment housing, to break down the size of such wood to small pieces; discharging the small wooden hazardous pieces out of the housing through a discharge pipe swivelable with respect to the housing; blowing the hazardous lead-base painted chips into a seperate mobile containment unit; exhausting any dust or hazardous fines out of the containment unit and into a seperate movable filtration unit; and entrapping the dust and fines in a bagging arrangement and discharging clean filtered air from the filtration unit. The method includes the steps of arranging the housing on a wheeled trailer frame to permit the waste chipper to be moved from one lead-base paint decontamination site to another, and arranging the containment unit and the filtration unit to be mobile by trailer means or wheels therewith. The method may include the step of treating the hazardous waste products to heat and mixing in a smelter to retrieve lead safely therefrom.

It is therefore an object of the present invention to provide a mobile system of waste treatment management which will not contribute to environmental contamination.

It is a further object of this invention to provide a hazardous waste control which provides for easy collection of waste products while at any particular geographic location.

It is yet a further object of this invention to provide a waste collection system which will not permit any hazardous environmentally unsafe waste from being discharged at a building decontamination site.

BRIEF DESCRIPTION OF THE DRAWINGS

The objects and advantages of the present invention will now become more apparent, when viewed in conjunction with the following drawings, in which.

DESCRIPTION OF THE PREFERRED EMBODIMENTS

Figures 1, 2:
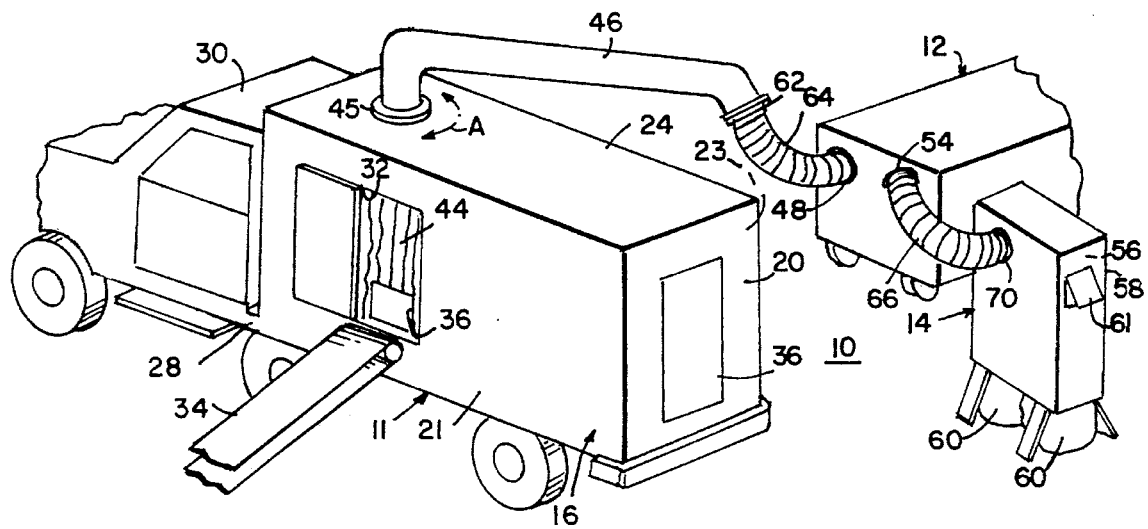
FIG. 1 is an overall perspective view of a movable waste treatment system arrangeable to be brought from one hazardous waste site to another.
FIG. 2 is a side elevational view of a trailer housing in partial section, with its intake and discharge arrangement shown therewith.

Referring now to the drawings in detail, and particularly to FIG. 1, there is shown a pictoral representation of a mobile lead paint hazardous waste containment system 10, comprising a mobile chipper unit 11, a chip containment unit 12 and a fines filter unit 14, all of which are separate and free standing, but are in fluid communication as described hereinbelow. The mobile chipper unit 11 comprises a housing 16 having a floor 18, and end wall 20, a forward wall 22, a pair of side walls 21 and 23, and a roof 24. The end wall 20 has a tight sealing leak-proof door 36 therethrough. The housing 16 is arranged on a wheeled truck frame 28, having a driver's cab 30 thereon.

A closable side port 32 is arranged through one of the side walls 21, as shown in FIG. 1, with a hazardous lead coated waste material conveyor belt 34 or chute, arranged to supply lead paint coated material into a feed hopper 36 of a chipper machine 38, the housing being generally airtight but for the side port 32 receiving arrangement and the enclosed chipped material discharge/containment arrangement.

The chipper 38, such as a Shutte trim scrap grinder, series HZF, available from Schutte Pulverizer Co. of Buffalo, N.Y., is rotatively empowered by a prime mover 40 such as a diesel or electric motor or the like through a connective drive shaft 42. An arrangement of flaps 44 may be hung over part of the side port 32 to minimize undesired air passage in or out of the housing 16. The chipper 38, during its operation, does create a suction, however, so as to maintain a flow of air (and dust) only into the housing 16 and particularly into the hopper 36. The chipper 38 has a discharge pipe 43 extending out of the housing 16, and in this embodiment, through the roof 24. The discharge pipe 43 may have a swivel joint 45 on the outer portion of the roof 24, thence a further discharge conduit 46 being directable or swivelable, as shown by the arrows "A" in FIG. 1.

Figure 3:
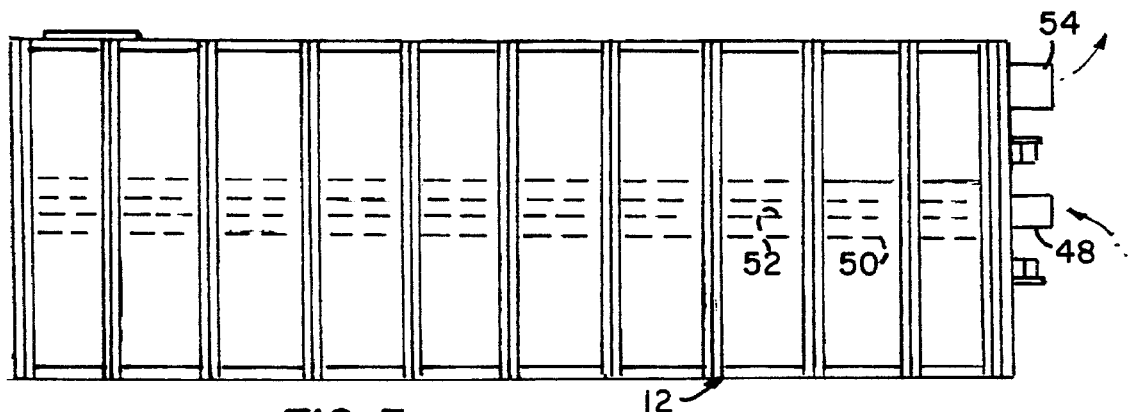
FIG. 3 is a plan view of a waste containment portion of the present invention.
Figure 4:
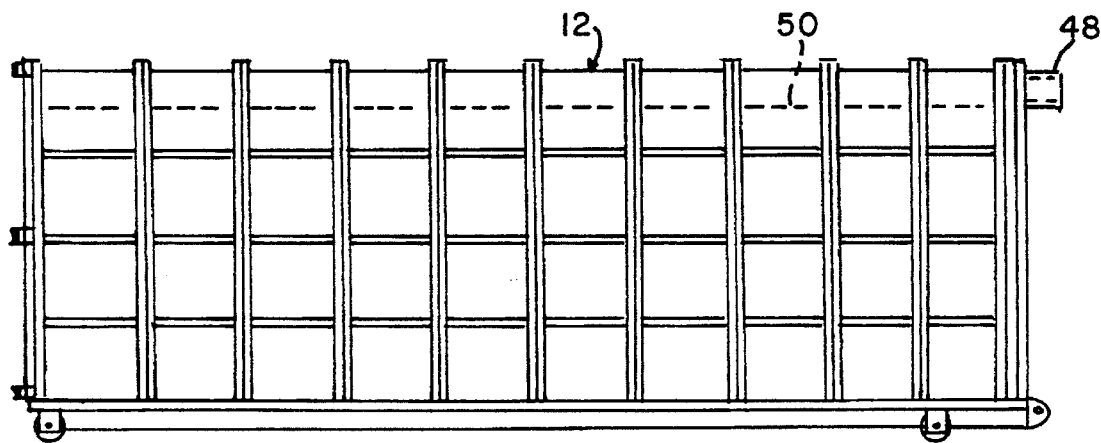
FIG. 4 is a side view of the waste containment unit of FIG. 3.
Figure 5:
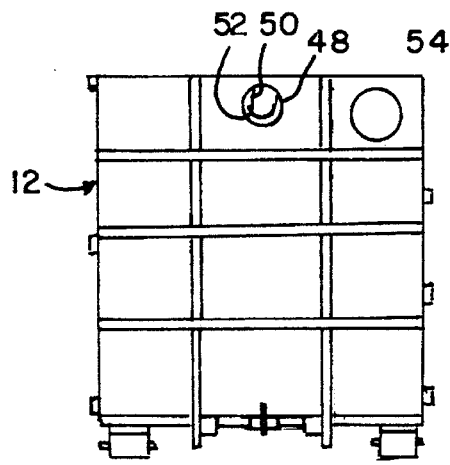
FIG. 5 is an end view of the waste containment unit shown in FIGS. 3 and 4.
Figure 6:
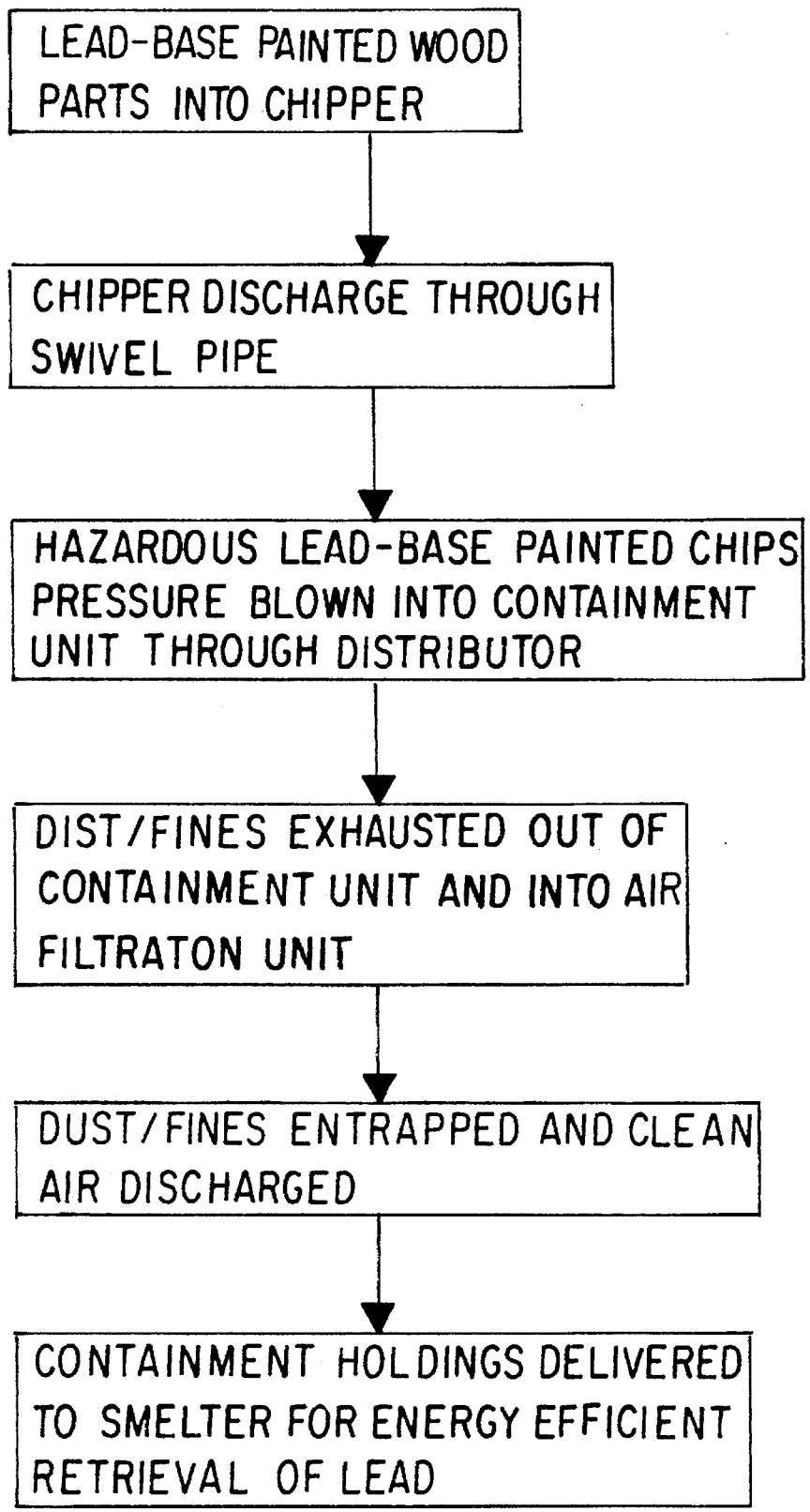
FIG. 6 is a block diagram showing the stepwise function of the present invention.

The further rigid discharge conduit 46 is directed over a side wall 23 and into the containment unit 12. The conduit may have portions which are flexible to further facilitate articulation thereof. The containment unit 12 is preferably is a 50 cubic yard air and water tight (except for the entry and discharge ports) wheeled storage container having flat walls, roof and floor. The containment unit 12 has an inlet port 48 at the middle upper portion, of one end wall, as shown in FIGS. 1, 3, 4 and 5. A chip dispersement chute 50, which in the prefered embodiment, is an inverted U-shaped channel 52 having an open end that is in longitudinal alignment with the inlet port 48, as shown in FIGS. 3, 4 and 5. As the pressurized lead painted chipped derbris is forced into the container 16, it is dispersed through the full length of the containment through the open downwardly facing slit of the channel 52.

The pressurized air entering the container 12 has to be released out through a discharge port 54, as shown in FIG. 1, and is subsequently pressurably discharged into a filtration system such as for example, an upper plenum chamber 56 of a trailerable mobile baghouse 58. A baghouse 58, is a filtration system, known in the art, for trapping fine dust particles, in this case, micron size lead paint particles from the primary containment unit 12, is available from ACFM Inc of Leominster, Mass., as an EC50 Baghouse. The plenum chamber 56 drops the dust into a plurality of thin filter bags, not shown, which traps the dust, and allows the dust particles to be captured in a plurality of plastic bags 60 at the bottom of the baghouse 58. Clean, hazardous particle-free air is discharged through a vent 61 in the side of the baghouse 58, as shown in FIG. 1.

The further discharge conduit 46, shown in FIG. 2 atop a cutaway view of the housing 16, has a distal connector 62 which is connectable to a flexible tubing 64 about 9 inches in diameter, that connects to the inlet port 48 of the containment unit 12. A larger flexible tubing 66, at about 12 inches in diameter, connects the discharge port 54 to an inlet port 70 on the plenum chamber 56 of the baghouse 58.

The swivel joint 45 on the roof 24, permits the mobile system 11 to be located on varied geographic terrain, so that the containment unit 12 and fines filter unit 14 (baghouse 58) can be placed where convenient, and removed when filled, or no longer needed, the containment unit 12 and fines filter 14 both being separately trailerable.

The typical product being sent into the hopper 36 of the clipper 38 is wood trim windows, wood doors or the like which has been painted with lead-base paint. The entire wood piece is chewed-up into small inch or several-inch size pieces and driven by pressurized air through the discharge pipe 43 and conduit 46 to the containment unit 12. This system thus comprises a waste treatment system having a mobile housing with an entry port combination to prevent contamination of the environment, by effecting a suction through that port in the housing and creating a pressure discharge arrangement into containment and filtration assemblies, and ultimately discharging only clean air into the environment while capturing harmful waste for recycling or permament disposition thereof.

With that concern for recycling, it has further been discovered, that these chips of wood, with their lead painted surfaces thereon, make excellant recyclable material for use in a lead recycling smelter, which easily burns off the small chips and pieces of wood, and retrieves the lead therefrom, for subsequent re-use in batteries! This ideal mix is possible because of the chipped size of the burnable particles of hazardous coated pieces of wood.

Thus what has been shown is a unique system for changing the form of a hazardous common article such as lead-base painted door, door frame, window frame or like wood piece, converting it, in a containment housing with an air flow being directed only inwardly into the housing and then into a closed containment system, as small recyclable bits of hazardous coated burnable pieces of wood chips and their fines, trapped in a containment unit, and trapped dust ultimately dumped into the containment unit with the larger chips, for final recycling into a smelter, for return into a new use in lead batteries after retrieval from their heating process in a smelter, or for burial at a proper hazardous waste treatment site.

I claim:

1. A mobile apparatus for the safe removal and containment of hazardous debris, comprising:

an enclosed structure having a plurality of side walls, a front and an end wall, a floor and a ceiling;

one of said side walls having an entry port therein;

a chipper mill arranged within said structure adjacent said side port;

a drive unit arranged and in driving communication with said chipper mill;

a discharge conduit from said chipper mill through a connector in said structure, to a discharge channel outside of said structure;

a swivel joint between said discharge conduit and said discharge channel to permit the discharge channel to be angularly moved to allow chipped debris to be directed towards a separate containment arrangement which includes a dust collection container arrangement that collects said debris in safe containment thereof, precluding any debris which enters said sideport of said structure from thereafter mixing with the outside environment, thus containing said contaminated debris within a controlled system to its final disposition.

2. A mobile apparatus for the safe removal and containment of debris as recited in claim 1, wherein said enclosured structure has a negative pressure generated by said chipper mill therewithin, with respect to said outside environment, thus keeping any minute waste particles from escaping said enclosure other than into said containment arrangement.

3. A mobile apparatus as recited in claim 2, wherein said pressurized enclosure includes an air pump for generating said negative pressure within said pressurized enclosure.

4. A mobile apparatus as recited in claim 3, wherein said air pump includes said chipper mill.

5. A mobile apparatus as recited in claim 2, wherein said discharge conduit includes a flexible conduit between said housing and containment units.

6. A mobile apparatus as recited in claim 1, wherein said enclosed structure is arranged on a wheeled frame.

7. A mobile apparatus as recited in claim 6, wherein said wheeled frame is movable by motive means, to different construction locations.

8. A mobile hazardous waste treatment system for the removal and recycling of hazardous debris, without exposure of that hazardous waste to the atmosphere outside of said system comprising:

a housing arranged on a mobile truck frame, said housing having an arrangement of front and side walls on a floor, and a roof member all enclosing a means for treating waste material, the mobile truck frame comprising a trailer unit, permitting the housing to be moved from one site to another;

a movable waste product container unit arranged to receive waste lead material from said trailer unit, said waste product container unit being in fluid communication with said trailer unit through an articulable conduit arranged therebetween;

a filtration unit being in fluid communication with said waste product container unit through a conduit arranged therebetween;

a side port arranged to direct hazardous waste into said waste chipping device;

a feed conduit for supplying hazardous lead base painted wood articles into said side port and into said waste chipping device;

a discharge conduit arranged from said chipping device through said housing to an articulable discharge conduit for transmitting small chips of wood with lead thereon into proper containment for subsequent safe utilization thereof.

9. A mobile hazardous treatment and removal system as recited in claim 8, wherein said system includes a containment unit having a receiving port for receiving chips from said discharge conduit.

10. A mobile hazardous waste treatment and removal system as recited in claim 9, wherein said articulable discharge conduit comprises a duct with a swivel joint arranged within a wall portion of said housing unit, to permit said discharge conduit to be readily directed towards the location of said waste containment unit.

11. A mobile hazardous waste treatment and removal system as recited in claim 10, wherein said means for treating said hazardous material comprises an empowered chipping machine which breaks up large pieces of lead covered timber products into small flowable pieces for conduction to said containment unit.

12. A mobile hazardous waste treatment and removal system as recited in claim 11, wherein said containment unit has a waste products dispersal distributor therein to spread said chips throughout said containment unit.

13. A mobile hazardous waste treatment and removal system as recited in claim 12, wherein said distributor comprises an inverted U-shaped channel with a lowermost slit extending along the length of said containment unit for the spreading of said chips therethrough.

14. A mobile hazardous treatment and removal system as recited in claim 9, wherein said chips in said containment unit are shipped to a smelter for recycling therein, to retrieve said lead therefrom.

15. A mobile hazardous treatment and removal system as recited in claim 8, wherein said means for treating said hazardous material generates a negative pressure through said input conduit to prevent escape of stray scraps of hazardous material from said trailer unit.

16. A mobile hazardous treatment and removal system as recited in claim 8, wherein said hazardous material are fed to a smelter for the subsequent retrieval of lead therefrom.

17. A method of treating wooden building components which have been painted with lead-based paint, to safely remove them from endangering people and harming the environment, comprising the steps of:

feeding lead-base painted wood components into a hazardous waste treatment chipper in an environmentally safe containment housing, to break down the size of such wood to small pieces;

discharging said small wooden hazardous pieces out of said housing through a discharge pipe swivelable with respect to said housing;

blowing said hazardous lead-base painted chips into a containment unit;

exhausting any dust or hazardous fines out of said containment unit and into a filtration unit; and entrapping said dust and fines in a bagging arrangement and discharging clean filtered air from said filtration unit.

18. The method according to claim 17, including the step of:

arranging said housing on a wheeled trailer frame to permit the waste chipper to be moved from one lead-base paint decontamination site to another.

19. The method according to claim 18, including the step of:

arranging said containment unit and said filtration unit to be mobile by trailer means or wheels therewith.

20. The method according to claim 19, including the step of:

treating said hazardous waste products to heat and mixing in a smelter to retrieve lead safely therefrom.

* * * * *